United States Patent
Wang et al.

(10) Patent No.: US 10,102,475 B1
(45) Date of Patent: Oct. 16, 2018

(54) CONTROL CIRCUIT FOR GENERATING LINEAR TERM OF SIGNALS

(71) Applicant: UNITED MICROELECTRONICS CORP., Hsin-Chu (TW)

(72) Inventors: Yun-Yuan Wang, Kaohsiung (TW); Shao-Hui Wu, Singapore (SG)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 0 days.

(21) Appl. No.: 15/800,083

(22) Filed: Nov. 1, 2017

(30) Foreign Application Priority Data

Sep. 29, 2017 (TW) .............................. 106133669 A

(51) Int. Cl.
 *G06N 3/06* (2006.01)
 *G06N 3/063* (2006.01)

(52) U.S. Cl.
 CPC ............... *G06N 3/063* (2013.01); *G06N 3/06* (2013.01); *G06N 3/0635* (2013.01)

(58) Field of Classification Search
 CPC ......... G06N 3/06; G06N 3/063; G06N 3/0635
 USPC .................................. 700/47–49; 706/33, 38
 See application file for complete search history.

(56) References Cited

U.S. PATENT DOCUMENTS

| | | | | |
|---|---|---|---|---|
| 4,875,183 A * | 10/1989 | Graf | ....................... | G06N 3/063 706/38 |
| 5,083,044 A * | 1/1992 | Mead | ..................... | G06N 3/063 327/514 |
| 5,155,377 A * | 10/1992 | Castro | .................. | G06N 3/0635 327/427 |
| 6,829,598 B2 * | 12/2004 | Milev | .................... | G06N 3/063 365/200 |
| 2003/0108221 A1 * | 6/2003 | Stevenson | .......... | G06K 9/00798 382/104 |

* cited by examiner

*Primary Examiner* — Gary L Laxton
*Assistant Examiner* — Peter Novak
(74) *Attorney, Agent, or Firm* — Winston Hsu

(57) ABSTRACT

A control circuit including a first switch to a third switch, an inverter, a first capacitor and a second capacitor. The first switch includes a first terminal receiving a weighting signal, and a second terminal. The second switch includes a first terminal, a control terminal coupled to the second terminal of the first switch, and a second terminal coupled to a reference voltage terminal. The third switch includes a first terminal coupled to the reference voltage terminal, a control terminal, and a second terminal. The inverter includes an input terminal coupled to a data input terminal, and an output terminal. The first capacitor is coupled between the data input terminal and the control terminal of the second switch. The second capacitor is coupled between the output terminal of the inverter and the control terminal of the third switch.

17 Claims, 10 Drawing Sheets

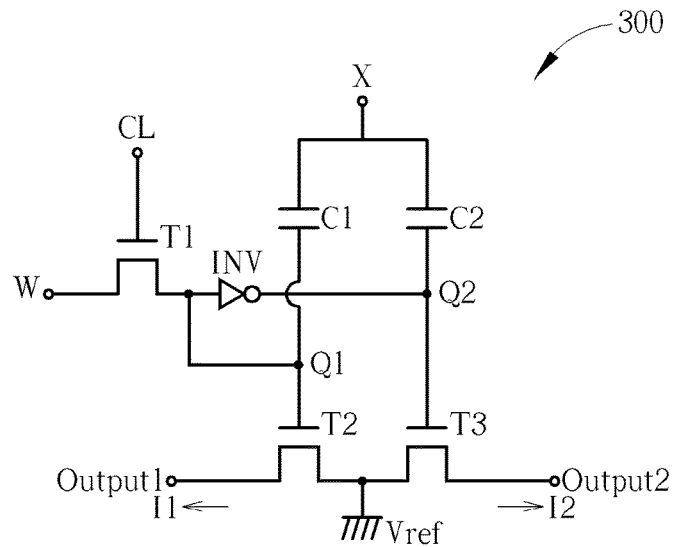

FIG. 11

| Turn on the first switch so that the weighting signal may be transmitted to the control terminal of the second switch and an inverted voltage level of the weighting signal may be transmitted to the control terminal of the third switch | ~1210 |

| Turn off the first switch and decrease a voltage level of the data signal to turn off the second switch and the third switch, keep the weighting signal at the control terminal of the second switch, and keep the inverted voltage level of the weighting signal at the control terminal of the third switch | ~1220 |

| While the first switch is off, increase the voltage level of the data signal to turn on the second switch and the third switch so as to output a first current from the first terminal of the second switch and a second current from the second terminal of the third switch | ~1230 |

FIG. 12

CONTROL CIRCUIT FOR GENERATING LINEAR TERM OF SIGNALS

BACKGROUND OF THE INVENTION

1. Field of the Invention

The invention relates to a control circuit, and more particularly, a control circuit used for generating a linear term of signals.

2. Description of the Prior Art

In the field of artificial neural networks (ANNs), weighted calculations with multiple data signals are often performed when executing algorithms. The calculation is as shown in FIG. 1.

FIG. 1 illustrates a calculation circuit 10 performing a calculation using data signals and weighting signals according to prior art. The calculation circuit 10 includes n+1 linear term units 110 to 11$n$ and an addition unit 195. The linear term unit 110 receives a data signal X0 and a weighting signal W0 and multiply the two signals to obtain a linear term X0×W0. The linear term unit 111 receives a data signal X1 and a weighting signal W1 and multiply the two signals to obtain a linear term X1×W1. Likewise, the linear term unit 11$n$ receives a data signal Xn and a weighting signal Wn and multiply the two signals to obtain a linear term Xn×Wn, where n is a positive integer.

A plurality of input terminals of the addition unit 195 receive the outputs of the linear term units 110 to 11$n$ for the addition unit 195 to perform weighted addition and output X0×W0+X1×W1+ . . . +Xn×Wn. The calculation result can be used in an artificial neural network algorithm.

Each of the foresaid linear term units 110 to 11$n$ is difficult to be implemented using electrical elements. For example, when using a transistor switch, a data signal and a weighting signal are inputted to the terminals of the transistor, and a current on the transistor can be expressed as $I \propto (Vg-Vth)^2$. I is the current, Vg is a voltage level at the control terminal of the transistor, and Vth is a threshold voltage of the transistor.

After expanding the term $(Vg-Vth)^2$, a polynomial $Vg^2 - 2 \times Vg \times Vth + Vth^2$ can be obtained. In the polynomial, the term $2 \times Vg \times Vth$ can be proportional to a linear term that is a product of a data signal and a weighting signal. However, the quadratic terms $Vg^2$ and $Vth^2$ are undesired. For eliminating the quadratic terms, an external circuit is necessary. Hence, the circuit area and complexity will be increased, and the production yield and the operation effect will be reduced.

SUMMARY OF THE INVENTION

An embodiment provides a control circuit including a first switch, a second switch, a third switch, an inverter, a first capacitor and a second capacitor. The first switch includes a first terminal used to receive a weighting signal, and a second terminal. The second switch includes a first terminal, a control terminal coupled to the second terminal of the first switch, and a second terminal coupled to a reference voltage terminal. The third switch includes a first terminal coupled to the reference voltage terminal, a control terminal, and a second terminal. The inverter includes an input terminal coupled to a data input terminal, and an output terminal. The first capacitor includes a first terminal coupled to the data input terminal, and a second terminal coupled to the control terminal of the second switch. The second capacitor includes a first terminal coupled to the output terminal of the inverter, and a second terminal coupled to the control terminal of the third switch.

Another embodiment provides a control circuit including a first switch, a second switch, a third switch, an inverter, a first capacitor and a second capacitor. The first switch includes a first terminal used to receive a weighting signal, and a second terminal. The second switch includes a first terminal, a control terminal coupled to the second terminal of the first switch, and a second terminal coupled to a reference voltage terminal. The third switch includes a first terminal coupled to the reference voltage terminal, a control terminal, and a second terminal. The inverter includes an input terminal coupled to the second terminal of the first switch, and an output terminal coupled to the control terminal of the third switch. The first capacitor includes a first terminal coupled to a data input terminal, and a second terminal coupled to the control terminal of the second switch. The second capacitor includes a first terminal coupled to the data input terminal, and a second terminal coupled to the control terminal of the third switch.

Another embodiment provides a method for controlling a circuit. The circuit includes a first switch, a second switch, a third switch, a first capacitor and a second capacitor. A second terminal of the first switch is coupled to a control terminal of the second switch and a second terminal of the first capacitor. A second terminal of the second switch is coupled to a first terminal of the third switch. A first terminal of the first capacitor is coupled to a data input terminal. An input terminal of the inverter is coupled to the data input terminal. An output terminal of the inverter is coupled to a first terminal of the second capacitor. A second terminal of the second capacitor is coupled to a control terminal of the third switch. The method includes when a write operation is performed, turning on the first switch to transmit a weighting signal to the control terminal of the second switch and the control terminal of the third switch; turning off the first switch; and adjusting a voltage level at the data input terminal to turn off the second switch and the third switch to charge the first capacitor and the second capacitor and keep the weighting signal at the control terminal of the second switch and at the control terminal of the third switch; and when a read operation is performed, turning off the first switch; and adjusting the voltage level at the data input terminal to turn on the second switch and the third switch.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 illustrates a control circuit according to another embodiment.

FIG. 12 illustrates a flowchart of an operation method of the control circuit of FIG. 11.

DETAILED DESCRIPTION

Figure 2:
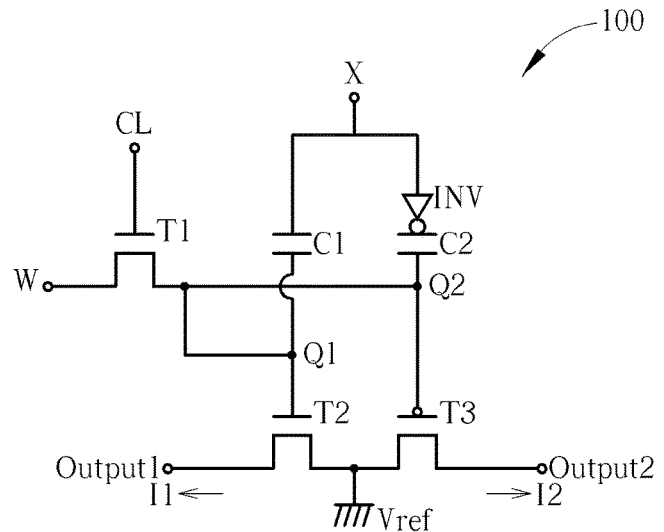
FIG. 2 illustrates a control circuit according to an embodiment.

FIG. 2 illustrates a control circuit 100 according to an embodiment. The control circuit 100 may include a first switch T1, a second switch T2, a third switch T3, an inverter INV, a first capacitor C1 and a second capacitor C2. The first switch T1 may include a first terminal, a control terminal and a second terminal, where the first terminal is used to receive a weighting signal W. The second switch T2 may include a first terminal, a control terminal and a second terminal, where the control terminal is coupled to the second terminal of the first switch T1, and the second terminal coupled to a reference voltage terminal Vref. The third switch T3 may include a first terminal, a control terminal and a second terminal, and the first terminal is coupled to the reference voltage terminal Vref. The inverter INV may include an input terminal and an output terminal, the input terminal is coupled to a data input terminal, and a voltage level at the data input terminal is a data signal X. The first capacitor C1 may include a first terminal and a second terminal, the first terminal is coupled to the data input terminal to receive the data signal X, and the second terminal is coupled to the control terminal of the second switch T2. The second capacitor C2 may include a first terminal and a second terminal, the first terminal is coupled to the output terminal of the inverter INV, and the second terminal is coupled to the control terminal of the third switch T3. The data signal X and the weighting signal W may be voltage signals. According to embodiments, the reference voltage terminal Vref may be a ground terminal or an appropriate voltage terminal.

The control terminal of the second switch T2 may be a node Q1, and the first terminal of the second switch T2 may be a node Output1. The control terminal of the third switch T3 may be a node Q2, and the second terminal of the third switch T3 may be a node Output2. The control terminal of the first switch T1 may receive a control signal CL to turn on or turn off the first switch T1.

According to an embodiment, the second switch T2 may be an n-type metal oxide semiconductor transistor, and the third switch T3 may be a p-type metal oxide semiconductor transistor. The first transistor T1 may be an n-type metal oxide semiconductor transistor or a p-type metal oxide semiconductor transistor. When the first transistor T1 is an n-type transistor, the control terminal may receive the control signal CL of a high voltage level to turn on the first transistor T1. When the first transistor T1 is a p-type transistor, the control terminal may receive the control signal CL of a low voltage level to turn on the first transistor T1.

Figure 3:
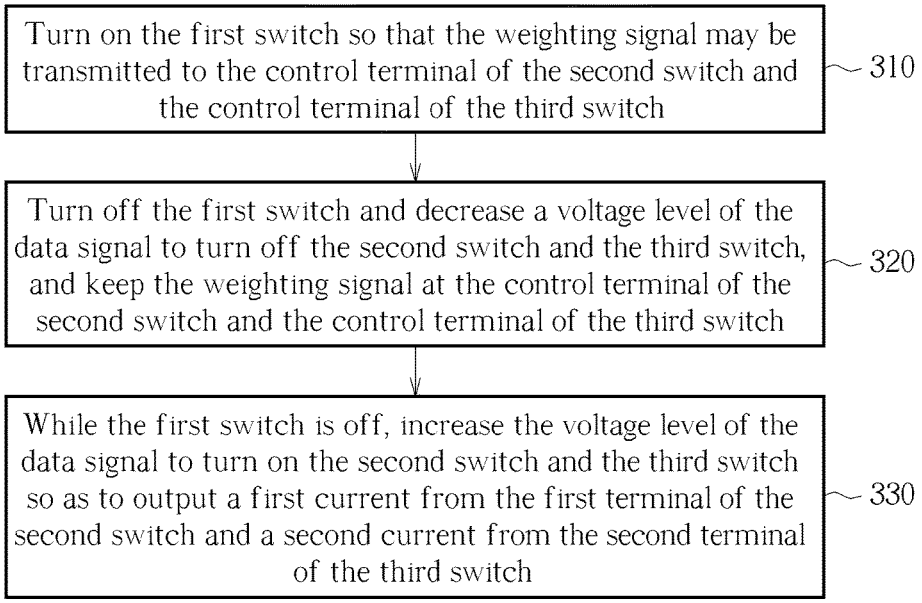
FIG. 3 illustrates a flowchart of an operation method of the control circuit of FIG. 2.

FIG. 3 illustrates a flowchart of an operation method of the control circuit 100. Steps 310 and 320 may be performed when performing a write operation, and Step 330 may be performed when performing a read operation. The operation method of the control circuit 100 may include:

Step 310: turn on the first switch T1 so that the weighting signal W may be transmitted to the control terminal of the second switch T2 and the control terminal of the third switch T3;

Step 320: turn off the first switch T1 and decrease a voltage level of the data signal X to turn off the second switch T2 and the third switch T3, keep the weighting signal W at the nodes Q1 and Q2, and output substantially no current from the nodes Output1 and Output2; and Step 330: while the first switch T1 is off, increase the voltage level of the data signal X to turn on the second switch T2 and the third switch T3 so as to output a first current I1 from the node Output1 and a second current I2 from the node Output2.

In this embodiment, when performing the read operation, the data signal X may be at a positive voltage level. In Step 320, the first capacitor C1 and the second capacitor C2 may be charged to keep the weighting signal W at the nodes Q1 and Q2. In Step 330, if the first transistor T1 is not turned off, the control signal CL may be adjusted to turn off the first transistor T1.

Figure 4:
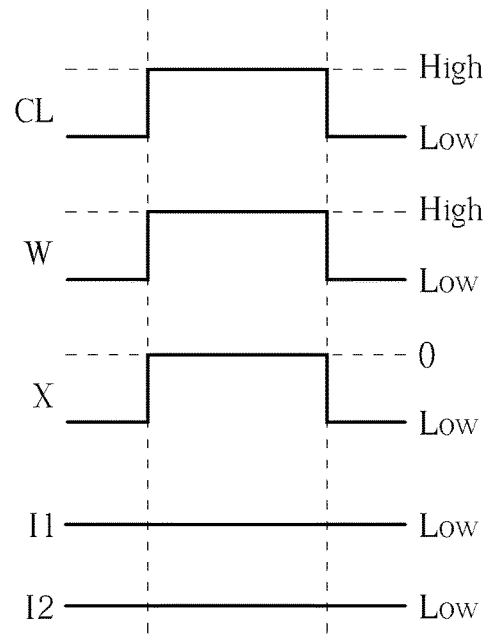
FIG. 4 illustrates signal waveforms of FIG. 2 when performing the write operation.
Figure 5:
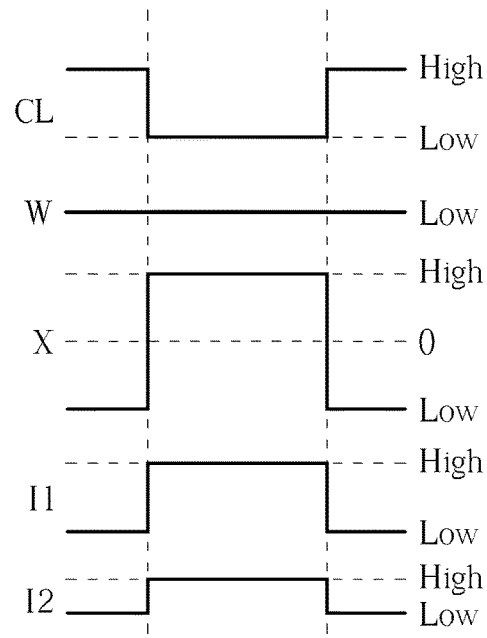
FIG. 5 illustrates signal waveforms of FIG. 2 when performing the read operation.

FIG. 4 illustrates signal waveforms of FIG. 2 when performing the write operation. FIG. 5 illustrates signal waveforms of FIG. 2 when performing the read operation. In FIG. 4, the first switch T1 is an n-type metal oxide semiconductor transistor as an example, and the voltage level of the control signal CL may be increased to turn on the first switch T1. The weighting signal W may be at a high level or a low level according to the data being calculated. In FIG. 4, the weighting signal W is set to be a high level as an example. As shown in FIG. 4, no current is outputted from the nodes Output1 and Output2 substantially, so the current values of the first current I1 and the second current I2 may be zero. In FIG. 5, the voltage level of the control signal CL may be decreased to turn off the first switch T1, and the voltage level of the data signal X may be increased for the first current I1 and the second current I2 to be outputted.

Figure 6:
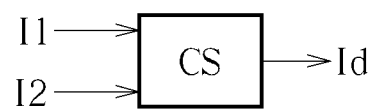
FIG. 6 illustrates the current subtraction unit according to an embodiment.

According to an embodiment, the control circuit 100 may further include a current subtraction unit CS. FIG. 6 illustrates the current subtraction unit CS. The current subtraction unit CS may include a first terminal coupled to the node Output1 to receive the first current I1, a second terminal coupled to the node Output2 to receive the second current I2, and an output terminal used to output the difference Id between the first current I1 and the second current I2.

Figure 1:
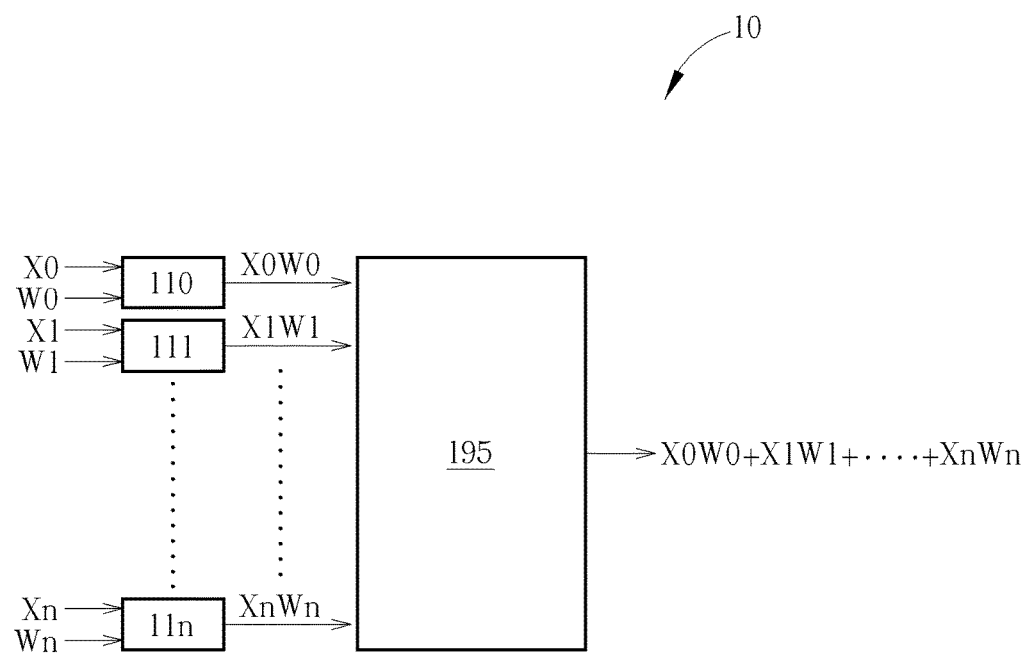
FIG. 1 illustrates a calculation circuit using data signals and weighting signals according to prior art.

When the second switch T2 and the third switch T3 of FIG. 1 operate in the saturation mode, the first current I1 may be expressed as $I1=k(W+X)^2$, and the second current I2 may be expressed as $I2=k(W-X)^2$. The parameter k may be expressed as $k=\mu C_{inv}(W_d/L_{th})$, where $\mu$ is mobility, $C_{inv}$ is a capacitance at a dielectric layer of the transistor, $W_d$ is a channel width of a transistor, and $L_{th}$ is a channel length of a transistor. Thus, the difference Id may be expressed as the equation eq-1:

$$Id=I1-I2=k(W+X)^2-k(W-X)^2=4\ kW \times X \propto W \times X \quad \text{(eq-1)}.$$

A linear item being proportional to the production of the data signal X and the weighting signal W may be obtained.

As shown in FIG. 2, a linear item unit may be implemented using the control circuit 100 including merely three transistors, one inverter and two capacitors, the circuit area is hence reduced.

Figure 7:
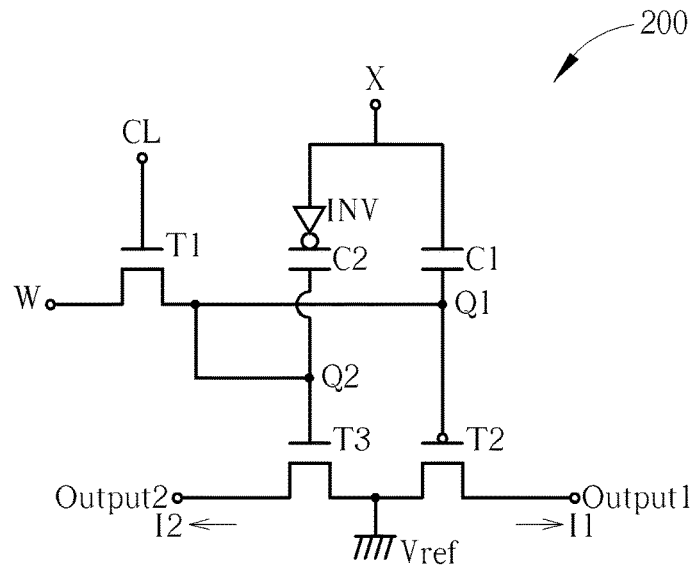
FIG. 7 illustrates a control circuit according another embodiment.

FIG. 7 illustrates a control circuit 200 according another embodiment. The control circuit 200 may be similar to the control circuit 100. However, in FIG. 7, the second switch T2 is a p-type metal oxide semiconductor transistor, and the third transistor T3 is an n-type metal oxide semiconductor transistor.

Figure 8:
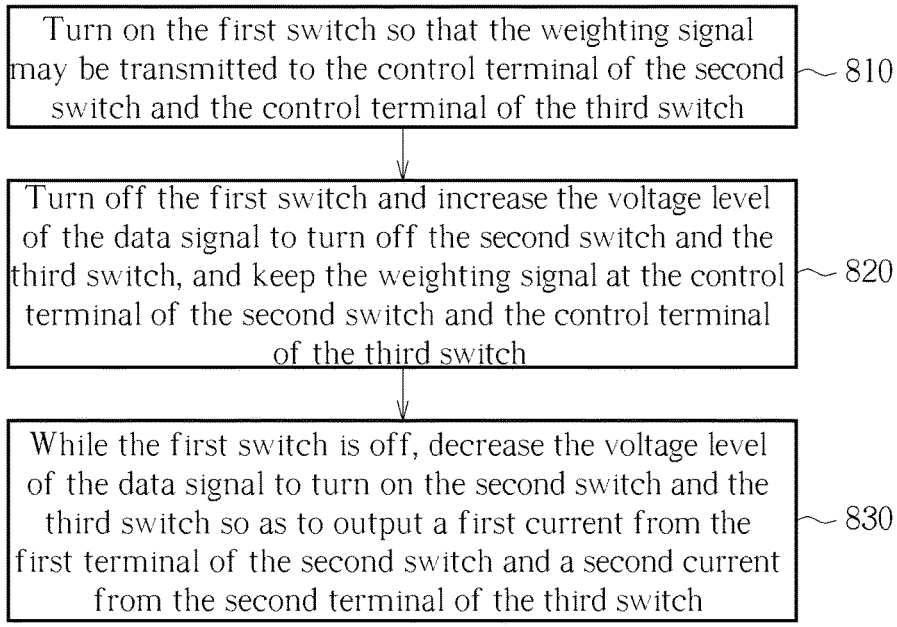
FIG. 8 illustrates a flowchart of an operation method of the control circuit of FIG. 7.

FIG. 8 illustrates a flowchart of an operation method of the control circuit 200. Steps 810 and 820 may be performed when performing a write operation, and Step 830 may be performed when performing a read operation. The operation method of the control circuit 200 may include:

Step 810: turn on the first switch T1 so that the weighting signal W may be transmitted to the control terminal of the second switch T2 and the control terminal of the third switch T3;

Step 820: turn off the first switch T1 and increase the voltage level of the data signal X to turn off the second switch T2 and the third switch T3, charge the first capacitor C1 and the second capacitor C2, keep the weighting signal W at the nodes Q1 and Q2, and output substantially no current from the nodes Output1 and Output2; and Step 830: while the first switch T1 is off, decrease the voltage level of the data signal X to turn on the second switch T2 and the third switch T3 so as to output a first current I1 from the node Output1 and a second current I2 from the node Output2.

In this embodiment, when performing the read operation, the data signal X may be at a negative voltage level. Like FIG. 2 and FIG. 6, the first current I1 and the second current I2 may be transmitted to the current subtraction unit CS to perform subtraction and obtain a linear item being proportional to the production of the data signal X and the weighting signal W. In Step 830, if the first transistor T1 is not turned off, the control signal CL may be adjusted to turn off the first transistor T1.

Figure 9:
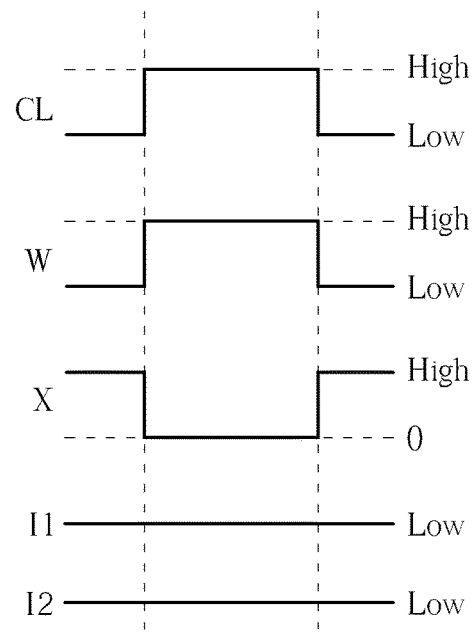
FIG. 9 illustrates signal waveforms of FIG. 7 when performing the write operation.
Figure 10:
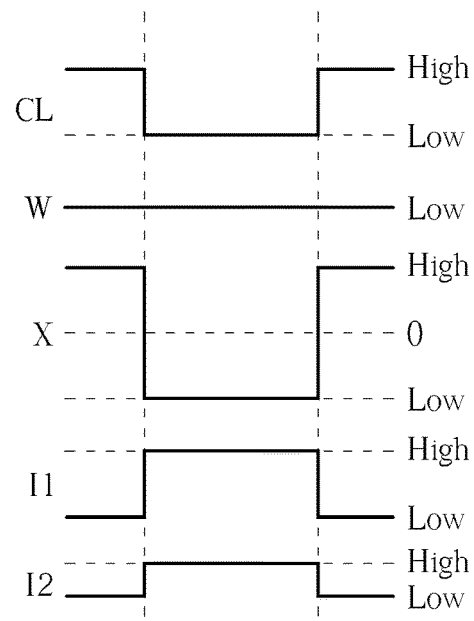
FIG. 10 illustrates signal waveforms of FIG. 7 when performing the read operation.

FIG. 9 illustrates signal waveforms of FIG. 7 when performing the write operation. FIG. 10 illustrates signal waveforms of FIG. 7 when performing the read operation. In FIGs. 7, 9 and 10, the first switch T1 is an n-type metal oxide semiconductor transistor as an example, and the voltage level of the control signal CL may be increased to turn on the first switch T1. The weighting signal W may be at a high level or a low level according to the data being calculated. In FIG. 9, the weighting signal W is set to be a high level as an example. As shown in FIG. 10, the voltage level of the data signal X may be decreased to be lower than zero voltage for the first current I1 and the second current I2 to be outputted.

FIG. 11 illustrates a control circuit 300 according to an embodiment. The control circuit 300 may include a first switch T1, a second switch T2, a third switch T3, an inverter INV, a first capacitor C1 and a second capacitor C2. The first switch T1 may include a first terminal, a control terminal and a second terminal, where the first terminal is used to receive a weighting signal W. The second switch T2 may include a first terminal, a control terminal and a second terminal, where the control terminal is coupled to the second terminal of the first switch T1, and the second terminal coupled to a reference voltage terminal Vref. The third switch T3 may include a first terminal, a control terminal and a second terminal, where the first terminal is coupled to the reference voltage terminal Vref. The inverter INV may include an input terminal and an output terminal, where the input terminal is coupled to the second terminal of the first switch T1, and the output terminal is coupled to the control terminal of the third switch T3. The first capacitor C1 may include a first terminal and a second terminal, where the first terminal is coupled to a data input terminal to receive a data signal X, and the second terminal is coupled to the control terminal of the second switch T2. The second capacitor C2 may include a first terminal and a second terminal, where the first terminal is coupled to the data input terminal to receive the data signal X, and the second terminal is coupled to the control terminal of the third switch T3. According to embodiments, the reference voltage terminal Vref may be a ground terminal or an appropriate voltage terminal.

The control terminal of the second switch T2 may be a node Q1, and the first terminal of the second switch T2 may be a node Output1. The control terminal of the third switch T3 may be a node Q2, and the second terminal of the third switch T3 may be a node Output2. The control terminal of the first switch T1 may receive a control signal CL to turn on or turn off the first switch T1. In FIG. 11, the second switch T2 and the third transistor T3 may be n-type metal oxide semiconductor transistors, and the first transistor T1 may be an n-type metal oxide semiconductor transistor or a p-type metal oxide semiconductor transistor.

FIG. 12 illustrates a flowchart of an operation method of the control circuit 300. Steps 1210 and 1220 may be performed when performing a write operation, and Step 1230 may be performed when performing a read operation. The operation method of the control circuit 300 may include:

Step 1210: turn on the first switch T1 so that the weighting signal w may be transmitted to the node Q1 and an inverted voltage level of the weighting signal W may be transmitted to the node Q2;

Step 1220: turn off the first switch T1 and decrease a voltage level of the data signal X to turn off the second switch T2 and the third switch T3, charge the first capacitor C1 and the second capacitor C2, keep the weighting signal W at the nodes Q1, keep the inverted voltage level of the weighting signal W at the node Q2, and output substantially no current from the nodes Output1 and Output2; and Step 1230: while the first switch T1 is off, increase the voltage level of the data signal X to turn on the second switch T2 and the third switch T3 so as to output a first current I1 from the node Output1 and a second current I2 from the node Output2.

In this embodiment, when performing the read operation, the data signal X may be at a positive voltage level. In Step 1230, if the first transistor T1 is not turned off, the control signal CL may be adjusted to turn off the first transistor T1.

Figure 13:
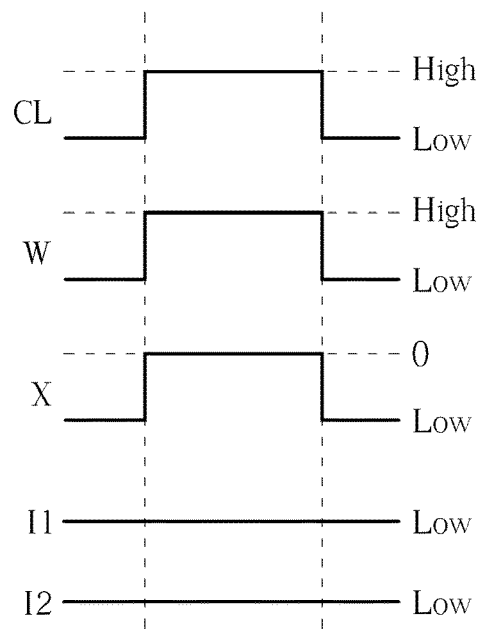
FIG. 13 illustrates signal waveforms of FIG. 11 when performing the write operation.
Figure 14:
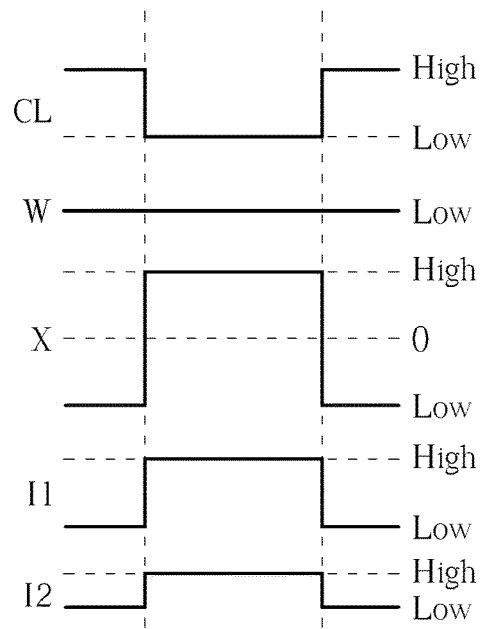
FIG. 14 illustrates signal waveforms of FIG. 11 when performing the read operation.

FIG. 13 illustrates signal waveforms of FIG. 11 when performing the write operation. FIG. 14 illustrates signal waveforms of FIG. 11 when performing the read operation. In FIG. 13, the first switch T1 is an n-type metal oxide semiconductor transistor as an example, and the voltage level of the control signal CL may be increased to turn on the first switch T1. The weighting signal W may be at a high level or a low level according to the data being calculated. In FIG. 13, the weighting signal W is set to be a high level as an example. As shown in FIG. 13, no current is outputted from the nodes Output1 and Output2 substantially, so the current values of the first current I1 and the second current I2 may be zero. However, in FIG. 14, the voltage level of the control signal CL may be decreased to turn off the first switch T1, and the voltage level of the data signal X may be increased for the first current I1 and the second current I2 to be outputted.

When the second switch T2 and the third switch T3 are metal oxide semiconductor transistor, the first current I1 may be expressed as $I1=k(W+X)^2$, and the second current I2 may be expressed as $I2=k(-W+X)^2$. As described above, the parameter k may be expressed as $k=\mu C_{inv}(W_d/L_{th})$. The control circuit 300 may further include a current subtraction unit CS as shown in FIG. 6. The current subtraction unit CS may have two input terminals coupled to the nodes Output1 and Output2 of FIG. 11 separately and used to obtain a difference of the first current I1 and the second current I2. The difference may be expressed as $I1-I2=4\,kW\times X \propto X\times W$. A linear item being proportional to the product of the weighting signal W and the data signal X may be obtained.

Figure 15:
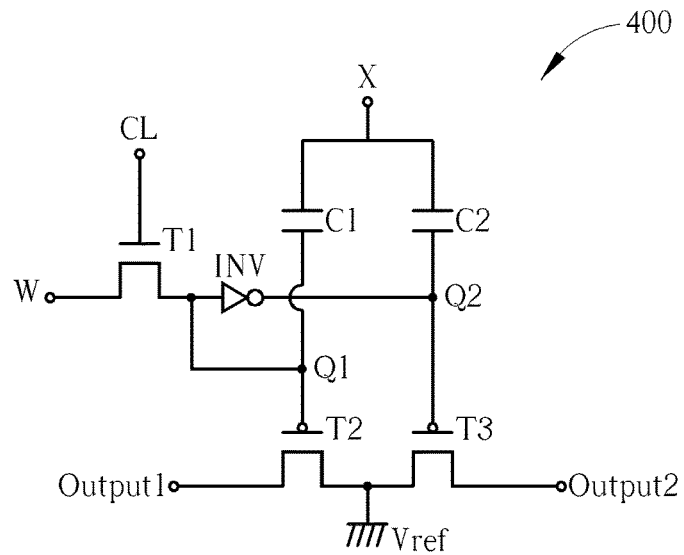
FIG. 15 illustrates a control circuit according to another embodiment.

FIG. 15 illustrates a control circuit 400 according to an embodiment. The control circuit 400 may be similar to the control circuit 300. However, in FIG. 15, the second switch T2 and the third switch T3 may be p-type metal oxide semiconductor transistors. The first transistor T1 may be an n-type metal oxide semiconductor transistor or a p-type metal oxide semiconductor transistor.

Figure 16:
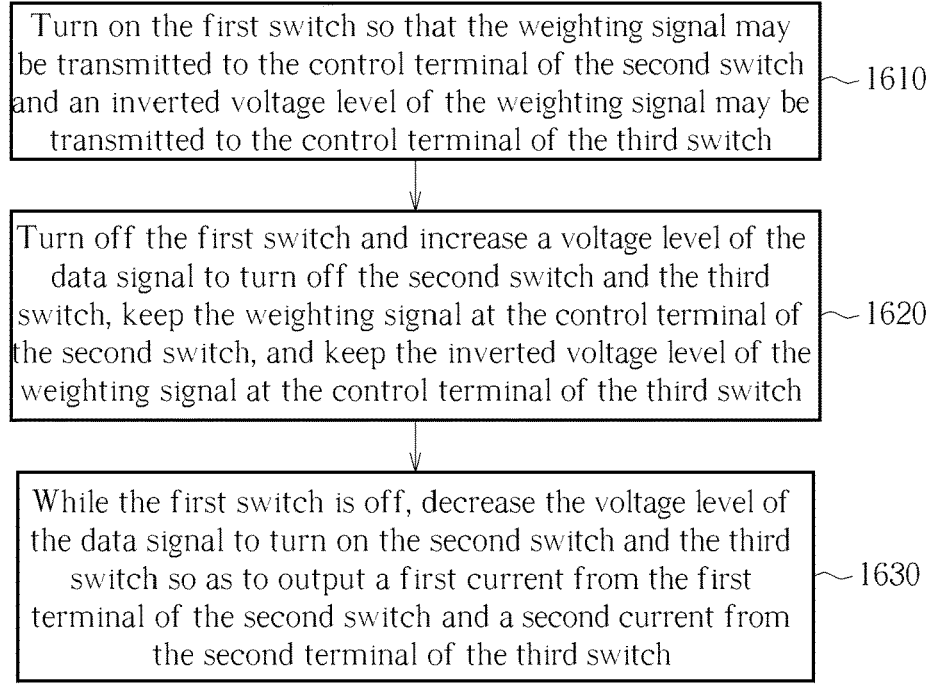
FIG. 16 illustrates a flowchart of an operation method of the control circuit of FIG. 15.

FIG. 16 illustrates a flowchart of an operation method of the control circuit 400. Steps 1610 and 1620 may be performed when performing a write operation, and Step 1630 may be performed when performing a read operation. The operation method of the control circuit 400 may include:

Step 1610: turn on the first switch T1 so that the weighting signal w may be transmitted to the node Q1 and an inverted voltage level of the weighting signal W may be transmitted to the node Q2;

Step 1620: turn off the first switch T1 and increase a voltage level of the data signal X to turn off the second switch T2 and the third switch T3, charge the first capacitor C1 and the second capacitor C2, keep the weighting signal W at the nodes Q1, keep the inverted voltage level of the weighting signal W at the node Q2, and output substantially no current from the nodes Output1 and Output2; and Step 1630: while the first switch T1 is off, decrease the voltage level of the data signal X to turn on the second switch T2 and the third switch T3 so as to output a first current I1 from the node Output1 and a second current I2 from the node Output2.

In this embodiment, when performing the read operation, the data signal X may be at a negative voltage level. In Step 1630, if the first transistor T1 is not turned off, the control signal CL may be adjusted to turn off the first transistor T1.

Figure 17:
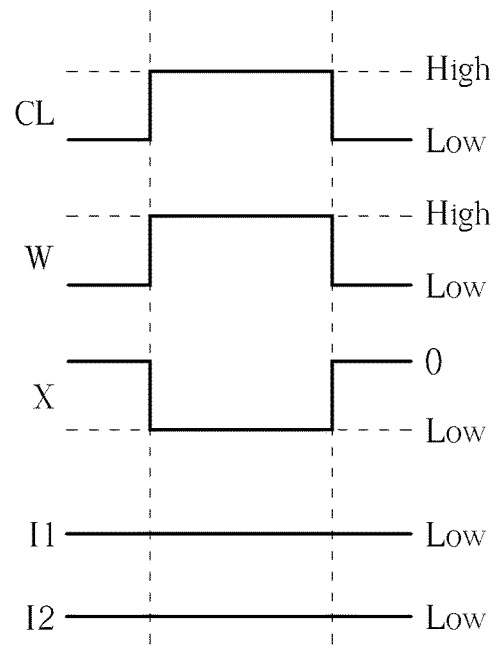
FIG. 17 illustrates signal waveforms of FIG. 15 when performing the write operation.
Figure 18:
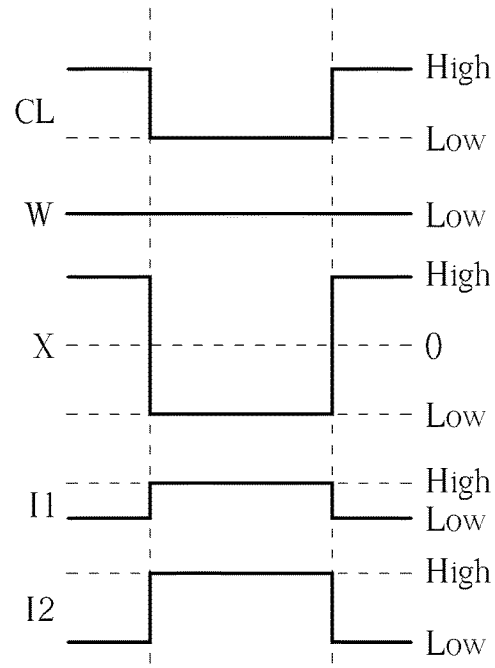
FIG. 18 illustrates signal waveforms of FIG. 15 when performing the read operation.

FIG. 17 illustrates signal waveforms of FIG. 15 when performing the write operation. FIG. 18 illustrates signal waveforms of FIG. 15 when performing the read operation. In FIG. 17, the first switch T1 is an n-type metal oxide semiconductor transistor as an example, and the voltage level of the control signal CL may be increased to turn on the first switch T1. The weighting signal W may be at a high level or a low level according to the data being calculated. In FIG. 17, the weighting signal W is set to be a high level as an example. As shown in FIG. 17, no current is outputted from the nodes Output1 and Output2 substantially, so the current values of the first current I1 and the second current I2 may be zero. However, in FIG. 18, the voltage level of the control signal CL may be decreased to turn off the first switch T1 when performing the read operation, and the voltage level of the data signal X may be decreased to be lower than zero voltage so that the first current I1 and the second current I2 may be outputted.

When the second switch T2 and the third switch T3 are metal oxide semiconductor transistors, the first current I1 may be expressed as $I1=k(W+X)^2$, and the second current I2 may be expressed as $I2=k(-W+X)^2$. As described above, the parameter k may be expressed as $k=\mu C_{inv}(W_d/L_{th})$. The control circuit 400 may further include a current subtraction unit CS shown in FIG. 6. The current subtraction unit CS may have two input terminals coupled to the nodes Output1 and Output2 of FIG. 15 separately and used to obtain a difference of the first current I1 and the second current I2. A linear item being proportional to the product of the weighting signal W and the data signal X may be obtained.

In summary, by means of control circuits and control methods according to embodiments, two currents may be obtained using limited number of switches and capacitors. The two currents may be used to calculate a linear item proportional to a weighting signal and a data signal. According embodiments, the number of elements may be limited, and the used subtraction unit may be simpler. For the field of artificial neural networks or applications needing to calculate linear items, control circuits and control methods according to embodiments may reduce the circuit area, decrease the circuit complexity, lower the production cost and improve the manufacture yield.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit comprising:
   a first switch including a first terminal configured to receive a weighting signal, and a second terminal;
   a second switch comprising a first terminal, a control terminal coupled to the second terminal of the first switch, and a second terminal coupled to a reference voltage terminal;
   a third switch comprising a first terminal coupled to the reference voltage terminal, a control terminal, and a second terminal;
   an inverter comprising an input terminal coupled to a data input terminal, and an output terminal;
   a first capacitor comprising a first terminal coupled to the data input terminal, and a second terminal coupled to the control terminal of the second switch; and
   a second capacitor comprising a first terminal coupled to the output terminal of the inverter, and a second terminal coupled to the control terminal of the third switch.

2. The control circuit of claim 1, wherein the second switch is an n-type metal oxide semiconductor transistor, and the third switch is a p-type metal oxide semiconductor transistor.

3. The control circuit of claim 2, wherein:
   when a write operation is performed,
      the first switch is turned on so that the weighting signal is transmitted to the control terminal of the second switch and the control terminal of the third switch, and
      the first switch is turned off so as to decrease a voltage level at the data input terminal to turn off the second switch and the third switch to keep the weighting signal at the control terminal of the second switch and at the control terminal of the third switch; and
   when a read operation is performed,
      the first switch is turned off; and
      the voltage level at the data input terminal is increased to turn on the second switch and the third switch so that a first current is outputted from the first terminal of the second switch and a second current is outputted from the second terminal of the third switch.

4. The control circuit of claim 3, further comprising a current subtraction unit configured to calculate a difference between the first current and the second current, the current subtraction unit comprising:
a first terminal coupled to the first terminal of the second switch and configured to receive the first current;
a second terminal coupled to the second terminal of the third switch and configured to receive the second current; and
an output terminal configured to output the difference between the first current and the second current.

5. The control circuit of claim 1, wherein the second switch is a p-type metal oxide semiconductor transistor, and the third switch is an n-type metal oxide semiconductor transistor.

6. The control circuit of claim 5, wherein:
when a write operation is performed,
the first switch is turned on so that the weighting signal is transmitted to the control terminal of the second switch and the control terminal of the third switch, and
the first switch is turned off so as to increase a voltage level at the data input terminal to turn off the second switch and the third switch to charge the first capacitor and the second capacitor and keep the weighting signal at the control terminal of the second switch and at the control terminal of the third switch; and
when a read operation is performed,
the first switch is turned off; and
the voltage level at the data input terminal is decreased to turn on the second switch and the third switch so that a second current is outputted from the first terminal of the second switch and a first current is outputted from the second terminal of the third switch.

7. The control circuit of claim 6, further comprising a current subtraction unit configured to calculate a difference between the first current and the second current, the current subtraction unit comprising:
a first terminal coupled to the first terminal of the second switch and configured to receive the second current;
a second terminal coupled the second terminal of the third switch and configured to receive the first current; and
an output terminal configured to output the difference between the first current and the second current.

8. A control circuit comprising:
a first switch comprising a first terminal configured to receive a weighting signal, and a second terminal;
a second switch comprising a first terminal, a control terminal coupled to the second terminal of the first switch, and a second terminal coupled to a reference voltage terminal;
a third switch comprising a first terminal coupled to the reference voltage terminal, a control terminal, and a second terminal;
an inverter comprising an input terminal coupled to the second terminal of the first switch, and an output terminal coupled to the control terminal of the third switch;
a first capacitor comprising a first terminal coupled to a data input terminal, and a second terminal coupled to the control terminal of the second switch; and
a second capacitor comprising a first terminal coupled to the data input terminal, and a second terminal coupled to the control terminal of the third switch.

9. The control circuit of claim 8, wherein the second switch and the third switch are n-type metal oxide semiconductor transistors.

10. The control circuit of claim 9, wherein:
when a write operation is performed,
the first switch is turned on so that the weighting signal is transmitted to the control terminal of the second switch and an inverted voltage level of the weighting signal is transmitted to the control terminal of the third switch, and
the first switch is turned off so as to decrease a voltage level at the data input terminal to turn off the second switch and the third switch to charge the first capacitor and the second capacitor and keep the weighting signal at the control terminal of the second switch and keep the inverted voltage level of the weighting signal at the control terminal of the third switch; and
when a read operation is performed,
the first switch is turned off; and
the voltage level at the data input terminal is increased to turn on the second switch and the third switch so that a first current is outputted from the first terminal of the second switch and a second current is outputted from the second terminal of the third switch.

11. The control circuit of claim 8, wherein the second switch and the third switch are p-type metal oxide semiconductor transistors.

12. The control circuit of claim 11, wherein:
when a write operation is performed,
the first switch is turned on so that the weighting signal is transmitted to the control terminal of the second switch and an inverted voltage level of the weighting signal is transmitted to the control terminal of the third switch, and
the first switch is turned off so as to increase a voltage level at the data input terminal to turn off the second switch and the third switch to charge the first capacitor and the second capacitor and keep the weighting signal at the control terminal of the second switch and keep the inverted voltage level of the weighting signal at the control terminal of the third switch; and
when a read operation is performed,
the first switch is turned off; and
the voltage level at the data input terminal is decreased to turn on the second switch and the third switch so that a first current is outputted from the first terminal of the second switch and a second current is outputted from the second terminal of the third switch.

13. The control circuit of claim 8, further comprising a current subtraction unit configured to calculate a difference between the first current and the second current, the current subtraction unit comprising:
a first terminal coupled to the first terminal of the second switch and configured to receive the first current;
a second terminal coupled the second terminal of the third switch and configured to receive the second current; and
an output terminal configured to output the difference between the first current and the second current.

14. The control circuit of claim 8, wherein the reference voltage terminal is a ground terminal.

15. A method for controlling a circuit, the circuit comprising a first switch, a second switch, a third switch, a first capacitor and a second capacitor, a second terminal of the first switch being coupled to a control terminal of the second switch and a second terminal of the first capacitor, a second terminal of the second switch being coupled to a first terminal of the third switch, a first terminal of the first capacitor being coupled to a data input terminal, an input terminal of the inverter being coupled to the data input terminal, an output terminal of the inverter being coupled to a first terminal of the second capacitor, a second terminal of the second capacitor being coupled to a control terminal of the third switch, and the method comprising:

when a write operation is performed,
        turning on the first switch to transmit a weighting signal to the control terminal of the second switch and the control terminal of the third switch;
        turning off the first switch; and
        adjusting a voltage level at the data input terminal to turn off the second switch and the third switch to charge the first capacitor and the second capacitor and keep the weighting signal at the control terminal of the second switch and at the control terminal of the third switch; and
    when a read operation is performed,
        turning off the first switch; and
        adjusting the voltage level at the data input terminal to turn on the second switch and the third switch.

16. The method of claim 15, wherein:

the second switch is an n-type metal oxide semiconductor transistor;

the third transistor is a p-type metal oxide semiconductor transistor;

when the write operation is performed, the voltage level at the data input terminal is decreased to turn off the second switch and the third switch;

when the read operation is performed, the voltage level at the data input terminal is increased to turn on the second switch and the third switch so that a first current is outputted from the first terminal of the second switch and a second current is outputted from the second terminal of the third switch; and the method further comprises:

calculating a difference between the first current and the second current.

17. The method of claim 15, wherein:

the second switch is a p-type metal oxide semiconductor transistor;

the third transistor is an n-type metal oxide semiconductor transistor;

when the write operation is performed, the voltage level at the data input terminal is increased to turn off the second switch and the third switch;

when the read operation is performed, the voltage level at the data input terminal is decreased to turn on the second switch and the third switch so that a second current is outputted from the first terminal of the second switch and a first current is outputted from the second terminal of the third switch; and the method further comprises:

calculating a difference between the first current and the second current.

* * * * *